United States Patent [19]
Boffito et al.

[11] Patent Number: 5,625,742
[45] Date of Patent: Apr. 29, 1997

[54] THERMALLY INSULATING JACKET UNDER REVERSIBLE VACUUM UTILIZING HYDROGEN GETTER IN COMBINATION WITH NON-EVAPORABLE PROMOTER GETTER

[75] Inventors: Claudio Boffito; Andrea Conte; Bruno Ferrario; Paolo della Porta, all of Milan, Italy

[73] Assignee: SAES Getters S.p.A., Italy

[21] Appl. No.: 268,536

[22] Filed: Jul. 6, 1994

[30] Foreign Application Priority Data

Jul. 8, 1993 [IT] Italy ................ MI93A1481

[51] Int. Cl.⁶ .................................................. F24H 7/04
[52] U.S. Cl. .................. 392/345; 392/346; 165/96; 126/400; 220/420; 429/120; 313/555
[58] Field of Search ................ 392/345, 339, 392/346; 165/96, 135, 902, 18; 126/400, 658, 653; 429/120; 313/553–555; 220/420–422; 373/112

[56] References Cited

U.S. PATENT DOCUMENTS

| 3,130,561 | 4/1964 | Hnilicka, Jr. ............... | 165/96 |
|---|---|---|---|
| 3,167,159 | 1/1965 | Bovenkerk ................ | 165/96 |
| 3,823,305 | 7/1974 | Schroder ................... | 392/344 |
| 3,830,288 | 8/1974 | Laing ....................... | 165/32 |
| 3,979,166 | 9/1976 | Zucchinelli ............... | 313/554 |
| 4,142,509 | 3/1979 | Hermann et al. .......... | 126/706 |
| 4,154,364 | 5/1979 | Hagiwara et al. .......... | 220/422 |
| 4,157,779 | 6/1979 | Ishii et al. ................. | 228/176 |
| 4,235,956 | 11/1980 | Gross et al. ............... | 429/120 |
| 4,455,998 | 6/1984 | Kroontje et al. .......... | 126/635 |
| 4,997,124 | 3/1991 | Kitabatake et al. ........ | 220/424 |
| 5,347,816 | 9/1994 | Nelson et al. ............. | 429/120 |

FOREIGN PATENT DOCUMENTS

| 62-4820 | 2/1987 | Japan ...................... | 313/554 |
|---|---|---|---|
| 6-22865 | 2/1994 | Japan ...................... | 220/421 |
| 93/25842 | 12/1993 | WIPO ..................... | 220/421 |
| 94/03763 | 2/1994 | WIPO ..................... | 126/400 |

*Primary Examiner*—Teresa J. Walberg
*Assistant Examiner*—John A. Jeffrey
*Attorney, Agent, or Firm*—David R. Murphy

[57] ABSTRACT

A thermally insulating jacket under reversible vacuum, having an inner wall, an outer wall and an hollow space between these walls. The hollow space is in fluid communication with an outer housing containing a reversible non-evaporable hydrogen getter loaded with hydrogen. The reversible hydrogen getter has a certain hydrogen equilibrium pressure. The hollow space contains a non-evaporable promoter getter having a certain hydrogen equilibrium pressure. These jackets can be employed with heat accumulators, batteries, cryogenic vessels, cryogenic pipes, catalytic silencers and solar panels.

29 Claims, 7 Drawing Sheets

50 Reversible Hydrogen Getter
52 Promoter Getter

THERMALLY INSULATING JACKET UNDER REVERSIBLE VACUUM UTILIZING HYDROGEN GETTER IN COMBINATION WITH NON-EVAPORABLE PROMOTER GETTER

BACKGROUND OF THE INVENTION

1) Field of the Invention

The invention relates to a thermally insulating jacket under reversible vacuum, having a heat-transfer coefficient which changes depending on the different possible situations during the usage, requiring sometimes a fair thermal insulation and sometimes, on the contrary, a rapid heat dissipation.

A jacket of this kind had already been proposed for insulation e.g. of a heat accumulator; see U.S. No. Pat. 3,823,305. Such a jacket was consisting of an inner wall, an outer wall and a hollow space between the two walls; one of the walls of an insulating jacket (in this case the inner one) has obviously to be hotter than the other. Said hollow space was typically containing:

(I) a reversible hydrogen getter, namely a getter which can release or reversibly re-adsorb minor or major amounts of hydrogen, depending on the temperature employed for heating or respectively cooling the getter;

(II) a first amount of hydrogen, chemically adsorbed by said getter in the solid state and depending on the getter temperature;

(III) a second amount of free gaseous hydrogen, which takes up the whole available volume inside the jacket; also this second amount depends on the getter temperature.

The hotter the getter the greater the amount of hydrogen shifting from the adsorbed state to the free gaseous state; the colder the getter the lower the amount of free hydrogen, hence its pressure. The higher the hydrogen pressure the higher, within certain limits, the heat-transfer inside the jacket.

A particular field of application of these jackets having hydrogen depending heat-transfer properties are the electrical accumulators installed on battery-driven cars, even if in a semiexperimental or testing phase. Such batteries, as known, are hot working (300°–425° C.) and are generally consisting of a couple lithium/sulphides (425° C.), sodium/sulphur (325° C.) or sodium/nickel chloride (300° C.). These batteries must quickly disperse the heat in case of overheating, which occurs, depending on the kind of battery, during the discharge phase, as in the case of the sodium/sulphur elements, or during the recharge phase, in the case of the lithium/sulphides batteries.

Apart from these situations, which repeatedly occur, in a cyclical way, during the normal run of a battery, it is also possible to observe emergency situations, as in the case e.g. of a rapid discharge or other, which could lead to a sudden overheating of the elements. In such situations it is equally important to have an effective means or an effective expedient for rapidly increasing the heat dissipation through the hollow space of the jacket.

The overheating can be avoided, as is known, by increasing very quickly the hydrogen pressure in the hollow space of the jacket because of the high thermal conductivity of $H_2$. Viceversa, when the conditions engendering the overheating are failing, it is necessary to minimize the heat dispersion in order to avoid a lowering of the temperature of the elements below the optimum efficiency level (300°–425° C.).

All this can be realized by restoring the low-pressure conditions in the hollow space of the jacket, by letting the reversible getter reabsorb the hydrogen. The thus obtained vacuum, on the other side, tends as is known to worsen with the time and it is therefore indispensable not only to rapidly create a satisfactory vacuum degree but also to grant the maintenance of said vacuum degree as long as possible.

The double requirement hereinabove (rapid increase and respectively rapid decrease of the hydrogen pressure) can be fulfilled, as a first approximation, by placing a non-evaporable reversible hydrogen getter in an insulated housing outside the jacket and in fluid communication with the same jacket.

An example of such a positioning of the getter according to the known technique is illustrated in FIG. 1. When it is necessary to maximize the insulation, the getter is cooled to room temperature and the hydrogen pressure is consequently lowered, for instance to a level below 1–0.1 Pa in the case of a battery-driven car, whereby the heat dissipation is limited. When it is necessary, on the contrary, to promote the heat dissipation, it is necessary to use an outer or inner electric heating device, which raises the temperature of the getter material; a considerable amount of hydrogen is thus released, which makes the hydrogen pressure rise even up to 1000 Pa, in the case of a battery-driven car.

Again, in this case of the battery-driven cars the expression "reversible vacuum" defines the possibility of shifting the vacuum from a minimum value of the working pressure equal or lower than 5 Pa, preferably 1 Pa and even better 0.1 Pa, to a maximum operative value equal or higher than 50 Pa and up to 1000 Pa.

2) The Prior Art

A non evaporable reversible hydrogen getter tested in the past was consisting for instance, of one alloy (Zr—V—Fe) containing (% by atoms):

ZF=33% V=33% Fe=balance.

However, also this reversible alloy does not still provide quite satisfactory results as to the manufacture, for instance of battery-driven cars; at least the following drawbacks can be in fact registered:

a) the hydrogen release and/or re-adsorption (especially this last passage) are too slow for applications which be at an actually industrial level;

b) said release and/or re-adsorption are even more slow if there is a considerable amount of carbon monoxide or of the other gases, different from hydrogen, usually present in a vacuum chamber ($CO_2$, $H_2O$, $O_2$, $N_2$, $CH_4$);

c) the hydrogen release rate and the hydrogen re-adsorption rate, not very high per se since the beginning, decrease rather quickly with the time; it is namely possible to observe a degradation with the time of the reversible gettering activity with respect to hydrogen.

Other getters were suggested by U.S. Pat. No. 4,455,998, that discloses the use in combination of a titanium-niobium alloy and of zirconium hydride; in this combination the titanium-niobium alloy acts as a reversible getter material for hydrogen, while zirconium hydride is an irreversible getter for oxygen, that releases hydrogen upon absorption of oxygen. However, the speed of hydrogen release and re-absorption of this combination of materials is too low, and far from being satisfactory from an industrial point of view.

A first object of the instant invention is to promote the hydrogen release rate and/or the hydrogen re-adsorption rate from and respectively by said reversible hydrogen getter.

A second object of the instant invention is to grant the creation and the maintenance of a fair vacuum degree in the hollow space of the insulating jacket hereinabove.

A third object of the instant invention is to extend in the time the action of said reversible getters, thus allowing said vacuum degree and said release and re-adsorption rate to long and steadily last at a high level.

A further object of the present invention is to keep said rates at a high level even in the presence of considerable amounts of carbon monoxide and/or other residual gases usually present in a vacuum.

Still another object of the present invention is to provide a battery for automotive traction purposes maintained at the optimum working temperature by means of the jackets of the invention.

DISCLOSURE

BRIEF SUMMARY OF THE INVENTION

In its broadest aspect, the present invention, allowing to realize the objects hereinabove, resides in a thermally insulating jacket under reversible vacuum, having an inner wall, an outer wall and an hollow space between said walls in fluid communication with an outer housing containing a reversible non-evaporable hydrogen getter, loaded with $H_2$ before use, wherein:

a) said reversible hydrogen getter has a hydrogen equilibrium pressure $Px_1$ lower than 10,000 Pa (preferably 1,000 Pa) at 500° C., when the hydrogen concentration in the getter is 0.1% b.w., and is kept at a variable or constant temperature Ti essentially different from the temperature Tc of the hotter wall of the jacket;

b) said hollow space contains a non-evaporable promoter getter having a hydrogen equilibrium pressure $Px_2$ higher than 10,000 Pa (preferably higher than ten times $Px_1$ and even better higher than one hundred times $Px_1$) at 500° C., when the hydrogen concentration in the getter is 0.1% b.w., which is essentially exposed to said temperature Tc.

In a thermally insulating jacket one of the walls is always hotter than the other one, but, depending on the particular device to be insulated, the hotter wall is not always the inner wall; for instance, in a cryogenic container the hotter wall is the outer one, whilst in the case of batteries for cars the hotter wall is the inner one. Said promoter getter is preferably in contact just with the hotter wall.

The amount of hydrogen in said reversible hydrogen getter before use is corresponding for instance, in the case of a battery-driven car, to a working pressure, inside the jacket, ranging from 5 Pa (preferably 1 Pa and even better 0.1 Pa), when the temperature is at room level, to 50 Pa (and up to 1000 Pa) when the temperature is at 500° C.

The Applicant noted, in other words, that the presence of a promoter getter, kept at the temperature Tc of the hotter wall of the insulating jacket, is extending in the time, in a really surprising and unexpected way, the reversible action of release and respectively re-adsorption of the reversible hydrogen getter. At the same time said promoter getter grants the creation and the long lasting maintenance of an excellent vacuum degree in the hollow space of the insulating jackets under reversible vacuum, for instance, in the case of a battery-driven car, between 1 and 0.1 Pa, granting nevertheless the continuity of the action of the reversible hydrogen getter in those emergency cases requiring a massive release of hydrogen.

In the jackets according to the invention the return time, namely the time required by the passage from a pressure of 100 Pa, when said temperature Ti is 500° C., to a pressure of 1 Pa, when said temperature Ti is at room level, can be lower than 10 minutes either in the absence or in the presence of carbon monoxide.

Moreover, the DRT (deep return time), namely the time required by the passage from a pressure of 100 Pa, when said temperature Ti is 500° C., to a pressure of 0.1 Pa, when said temperatute Ti is at room level, can be lower than 15 minutes and preferably 12 minutes either in the absence or in the presence of carbon monoxide.

All this did never happen beforehand, notwithstanding the several efforts for selecting an actually effective hydrogen getter for the reversible vacuum. Said return time and DRT are particularly very low when the housing containing the hydrogen reversible getter is provided with heat dispersing blades and fins.

One typical example of said promoter getter is essentially consisting of the Zr—Mn—Fe alloys and more generally of the Zr—$M_2$ alloys, wherein M is a transition element selected from Cr, Mn, Fe, Co, Ni and mixtures thereof. These alloys are sold by the Applicant as St 909 and are for instance described in U.S. Pat. No. 5,180,568 assigned to the Applicant. Other getter alloys suitable for this purpose are the alloys based on titanium and nickel (Ti/Ni), as well as the lanthanum-nickel alloys of the $AB_5$ type described in EP-A-O,538,622 and the HM and LM alloys (Ti-V alloys containing a high or respectively low amount of manganese) mentioned in the Italian patent application MI-93-A-000851 in the name of the Applicant.

One typical example of said non-evaporable reversible hydrogen getters is consisting of zirconium and/or titanium, of the Zr—Al alloys (see U.S. Pat. No. 3,780,501) and of the alloys containing zirconium and vanadium, in particular the Zr—V—Fe alloys, described for instance in U.S. Pat. No. 4,312,669 and 4,839,085.

Said Zr—V—Fe alloys have a percent composition by weight which, when recorded on a diagram suitable for ternary compositions, is lying inside a polygon having at its vertices the points defined as follows:

a) 78% Zr—20% V—2% Fe b) 45% Zr13 20% V—35% Fe c) 48% Zr—50% V—2% Fe

Preferably said reversible hydrogen getter may be a non-evaporable ternary alloy Zr—V—Fe having a percent composition (by weight) which, when recorded on a diagram suitable for ternary compositions is lying inside a polygon having at its vertices the points defined as follows:

d) 70% Zr—35% V—5% Fe e) 70% Zr—24% V—6% Fe f) 66% Zr—24% V—10% Fe g) 47% Zr—43% V—10% Fe h) 47% Zr—45% V—8% Fe i) 50% Zr—45% V—5% Fe.

Really excellent results were obtained from the alloys sold by the Applicant as St 707, having the following composition by weight:

Zr=70% V=24,6% Fe=balance.

It is finally possible to use mixtures of said reversible hydrogen getters and mixtures of said promoter getters, each for the respective functions.

The two kinds of getter materials (reversible and promoter) are installed separately. The Applicant noted however that whenever the reversible hydrogen getter is coated with a thin protective layer of promoter getter, essentially kept at the same temperature Ti of the reversible hydrogen getter, the constancy of the high release and reabsorption rates of the reversible hydrogen getter is even more prolonged. The protective layer of promoter getter, in its turn, may be advantageously surrounded by a porous septum made from metal, ceramics, glass or other equivalent material. Said protective layer may be also consisting of a second promoter getter different from the separate promoter getter kept at a constant Tc temperature instead of Ti.

Generally the ratio between the mass of said protective layer and the sum of the mass of said reversible hydrogen getter and of the mass of the promoter getter exposed to said temperature Tc is from 0.001:1 to 1:1 and preferably from 0.01:1 to 0.5:1.

The reversible hydrogen getter is loaded, before use, with a calibrated amount of hydrogen allowing to reach, in the hot phase, the predetermined pressure in the hollow space of the insulating jacket, naturally when it is required to change the vacuum conditions.

Both the reversible hydrogen getter and the promoter getter may be used in the form of a powder, optionally placed in a housing having at least one porous wall. Said powder has generally an average particle size from 0.1 to 500 micrometer, preferably from 0.1 to 250 micrometer and even better from 0.1 to 125 micrometer. Very satisfactory results can be obtained if at least 85% by volume of the particles has an average size lower than 100 micrometer and wherein the volume percentage of the particles having an average size lower than 15 micrometer is equal to or lower than 10%.

Said powder, however, may be converted, before use, into shaped bodies like pellets, granules, tablets, rings, saddles, coated strips and similar.

The shaping of said bodies may be carried out by means of compression and sintering; in its turn said sintering may be carried out by means of a simple heating or resorting both to a heating and to the presence of a second powder, as is described for instance in GB-A-2,077,487, thus reaching a rather high porosity degree. The average size of said shaped bodies is a few millimeter, generally from 0.5 to 5 mm.

Good results are obtained when the separate promoter getter (temperature=Tc) is in contact with the hotter wall, in the form of a toroidal belt or strip or of a simple layer or thin plate lying on a plane surface of a jacket's wall.

The hollow space of said jacket may be empty or alternatively filled, in a partial or complete way, by a solid insulating material like for instance an expanded polymer (polystyrene, phenol-formaldehyde resins, polyacetalic resins and so on) having a very low density.

The shape of the jackets according to the invention may be e.g.:
 the cylindrical shape;
 the hemicylindrical shape;
 the shape of two hemicylinders, wherein the first is under reversible vacuum and the second is under stable vacuum or under reversible vacuum.

The reversible insulating jacket according to the present invention may be applied with considerable advantage to many different kinds of apparatuses; we quote, for mere exemplificative purposes, the heat accumulators, the solar panels, the electric accumulators and the cryogenic vessels (Dewar) having a wide size, especially if they have to be rapidly loaded and unloaded, with a high temperature gradient. We quote as well the catalytic silencers of cars and trucks, which could be insulated in a variable way, depending on the operative conditions.

BRIEF DESCRIPTION OF THE DRAWINGS

A few aspects of the present invention will be evident to a skilled in the art by referring to the following description and examples, which are however supplied for merely illustrative and non limitative purposes, while referring to the attached drawings wherein.

DETAILED DESCRIPTION OF THE INVENTION

Figure 2:
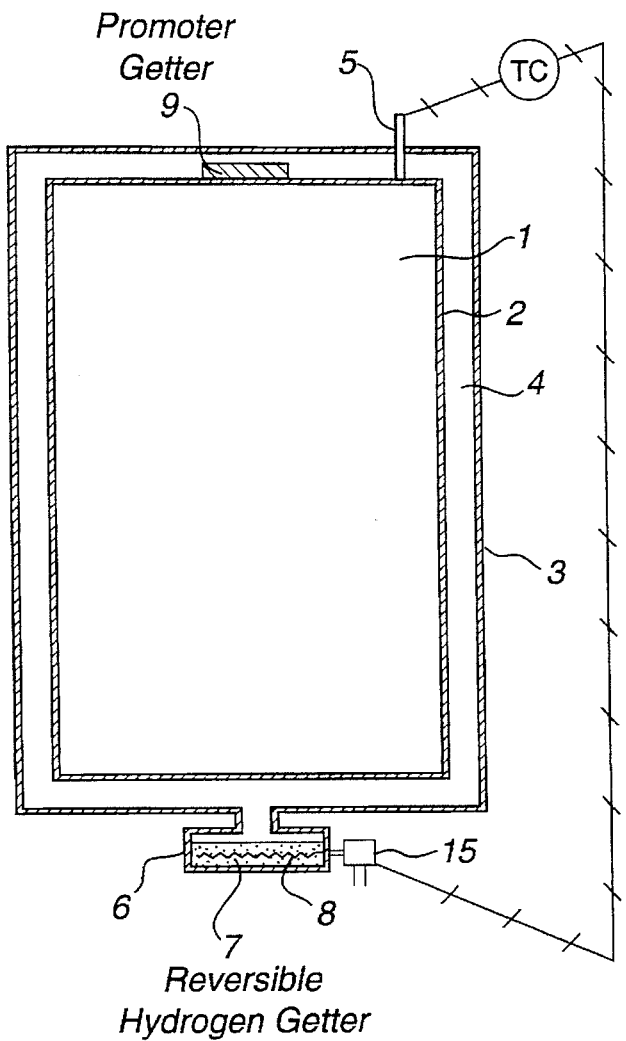
FIG. 2 is a similar cross-section of an insulating jacket under reversible vacuum according to the present invention.
Figure 3:
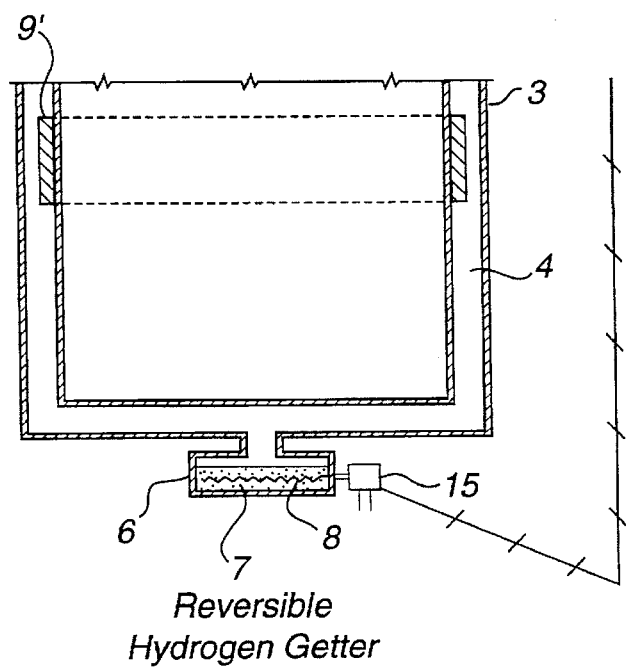
FIG. 3 is a variant of FIG. 2 wherein the promoter getter surrounds as a toroidal strip the inner cylindrical wall and is in contact with the same inner wall.

Referring now to FIGS. 2 and 3 a space which has to be thermoregulated, for instance a battery working at elevated temperatures to be installed on a battery-driven car, is surrounded by an inner cylindrical wall 2 forming, together with the outer cylindrical wall 3, an insulating jacket, wherein a predetermined degree of vacuum does exist in the hollow space 4 of said jacket 1. A thermocouple 5 is connected, by means of a temperature controller TC, to a small housing 6, outside the insulating jacket, which is kept at a temperature different from the jacket's temperature. In said housing 6, in fluid communication with the hollow space 4, there is a reversible hydrogen getter 7, for instance a Zr—V—Fe alloy, in the form of a powder or of pellets, tablets or others, which can be quickly heated or cooled by a thermal element 8, connected to a thermostat 15, operated in its turn by the temperature controller TC.

Referring again to FIGS. 2 and 3, the hollow space 4 contains also a separate promoter getter 9 or 9', exposed to a temperature Tc, which succeeds in accelerating and stabilizing in the time, in a really surprising way, either the $H_2$ emission rate (or release rate) or the $H_2$ re-adsorption rate of the reversible hydrogen getter 7.

Figure 4:
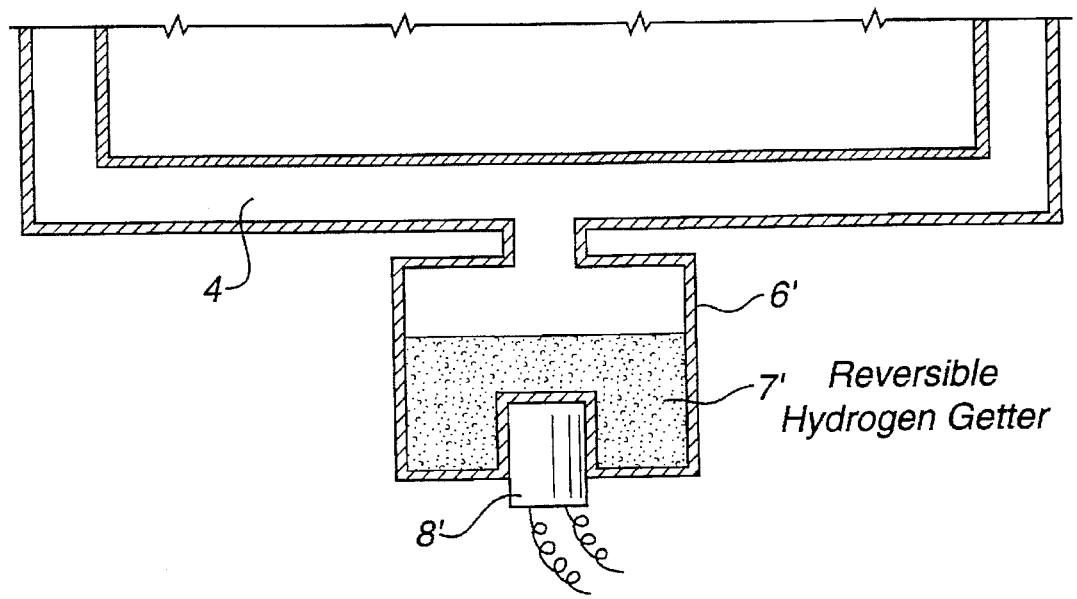
FIG. 4 illustrates a different way of housing the reversible hydrogen getter, with respect to FIGS. 2 and 3, wherein, according to a variant represented in FIG. 4a, the gettering mass is completely contained in a porous septum (diaphragm, filter) in the form of an enveloping foil.

With reference to FIG. 4, a reversible hydrogen getter 7' is lodged in a cylindrical housing 6' provided with an electric heating element 8', coaxial with said housing 6'. Said heating element 8' may be directly immersed in the getter material or may be arranged outside in a recess of the wall of the housing 6'.

Figure 5:
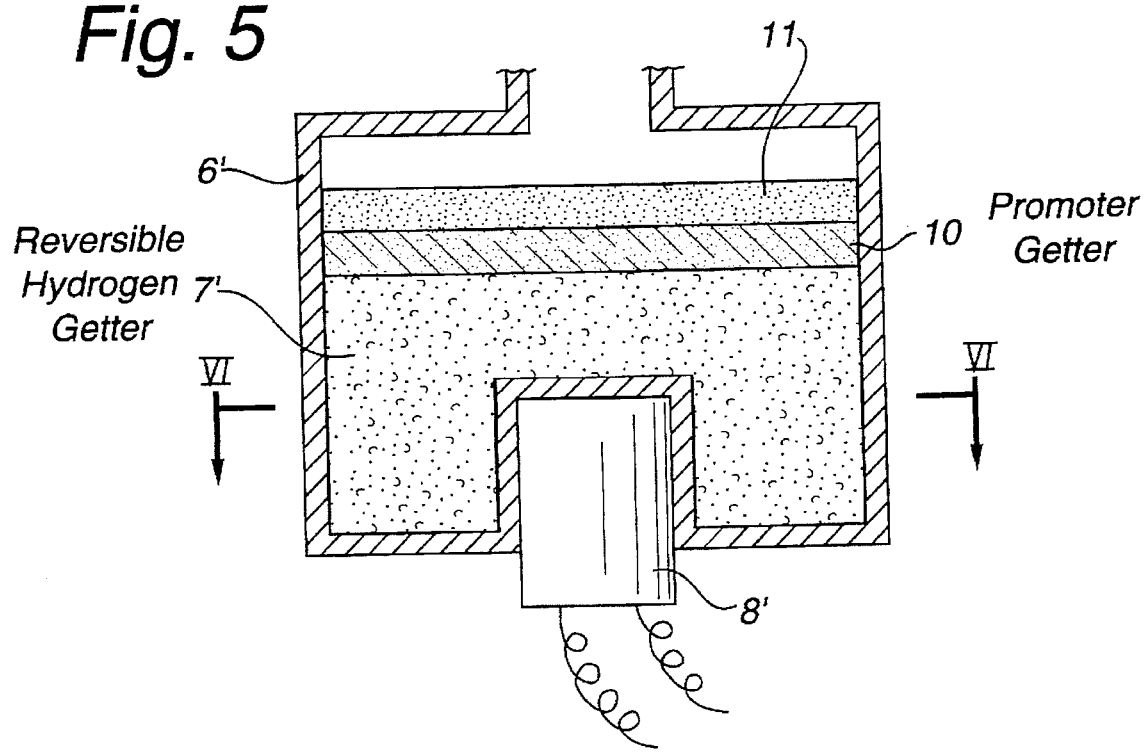
FIG. 5 is a cross-section of a device of the type indicated in FIG. 4, containing the reversible hydrogen getter coated by a protective layer of promoter getter and surmounted by a porous septum.

FIG. 5 shows an improvement consisting of a coating of the reversible hydrogen getter 7' with a thin protective layer of promoter getter 10, surmounted by a porous diaphragm 11, which remarkably prolongs, at a high level, the high $H_2$ emission rate and $H_2$ re-adsorption rate off the reversible hydrogen getter.

Figure 1:
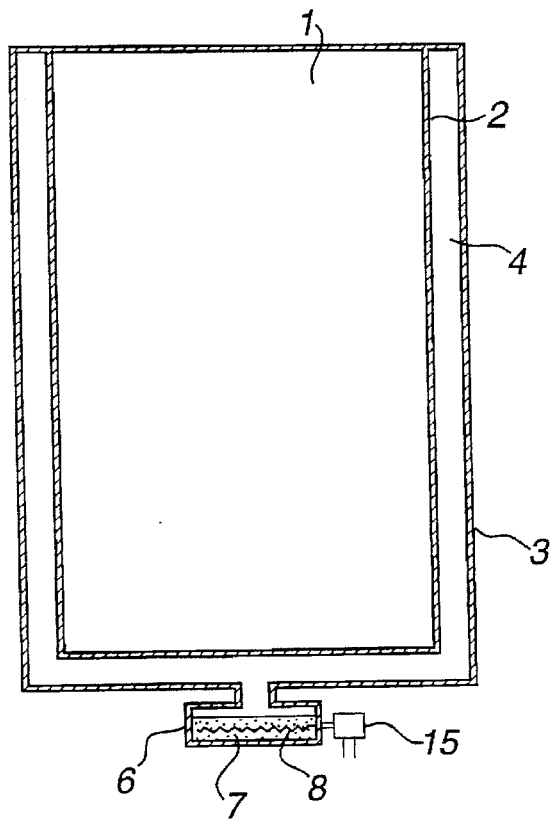
FIG. 1 is the cross-section of an insulating jacket under reversible vacuum according to the prior art.
Figure 7:
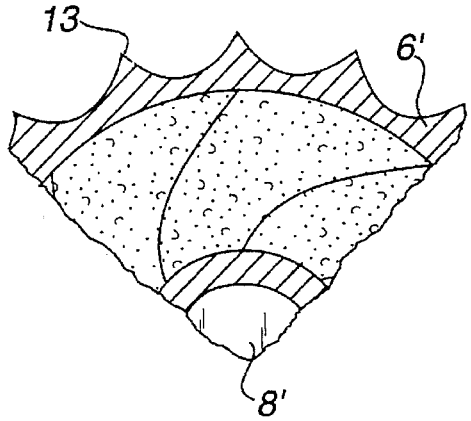
FIG. 7 is a partial view of a cross-section of a housing loaded with reversible hydrogen getter and provided with heat dispersing fins.
Figure 6:
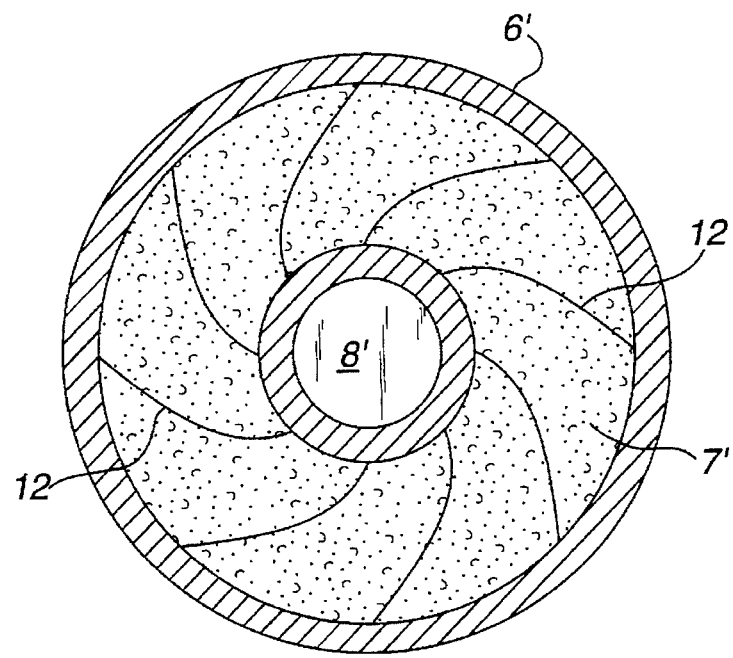
FIG. 6 is a cross-section along line VI—VI of FIG. 5.

FIG. 6 is cross-section along line VI—VI of FIG. 5, showing the possibility of inserting into the getter mass a crown of blades 12, plane or curved, made from a heat conducting material in order to improve the heat-transfer either during the heating of the reversible hydrogen getter or, especially, during its cooling. FIG. 7 in its turn is the partial cross-section of a housing, here still provided with blades as in FIG. 6, having outer walls supplied with fins (13) even more promoting the thermal dispersion. Naturally, the housing of FIG. 7 could be of whatsoever other type and not necessarily provided with blades.

Figures from 8 to 12 are described in detail in the examples hereinbelow.

Figure 13:
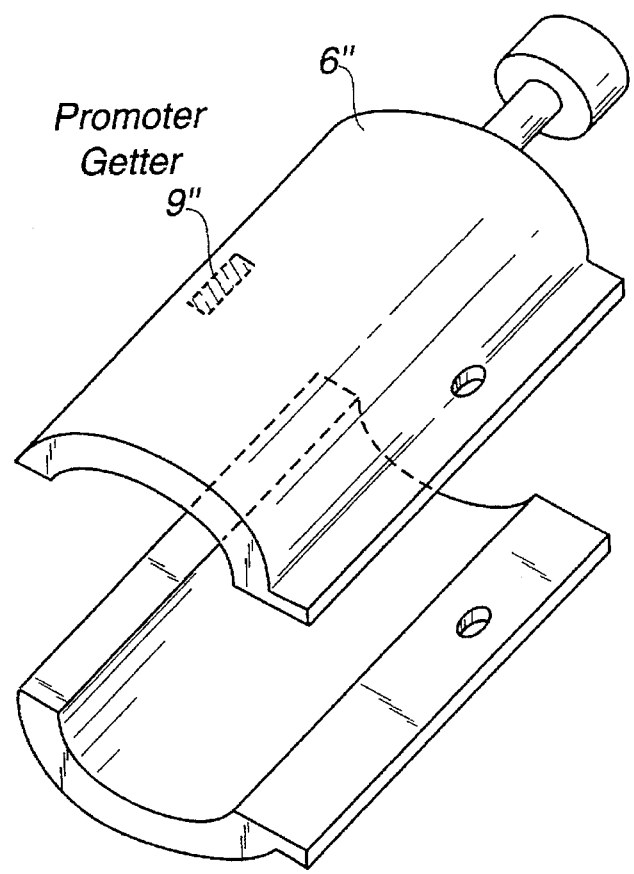
FIG. 13 is an example of insulating jacket having a particular ( hemicylindrical ) shape, suitable for catalytic silencers.

FIG. 13 shows an insulating jacket under reversible vacuum having a hemicylindrical shape, provided with inner promoter getter 9" and outer housing 6" containing the reversible hydrogen getter, present but not visible, optionally coated with a thin layer of promoter getter.

As an alternative, one may use two hemicylindrical jackets, both under reversible vacuum or the first under stable vacuum and the second under reversible vacuum, the one near the other as to simulate a cylindrical jacket. The nozzle putting in fluid communication the jacket and the housing 6" may be in the position indicated in FIG. 13 or in whatsoever other suitable position.

The following examples are supplied for merely illustrative purposes and do not limit in any case the scope and the spirit of the invention. The experimental work was carried out using an empty hollow space, but is possible to obtain great advantages also with an hollow space partially or completely filled with solid insulating material.

EXAMPLE 1

Figure 8:
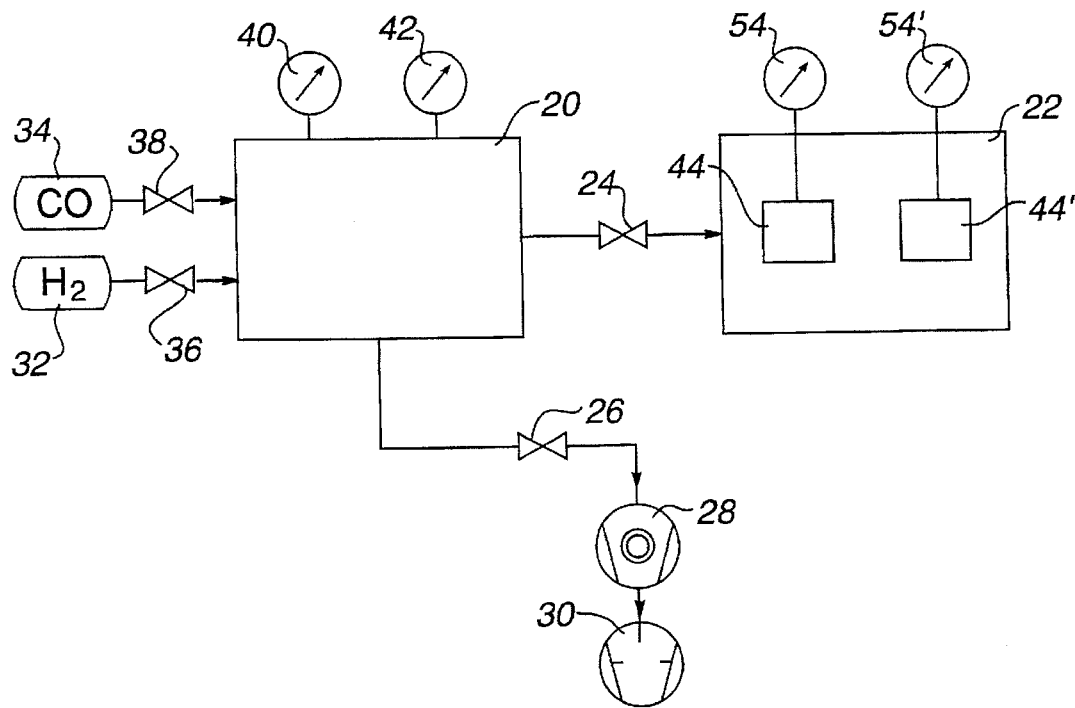
FIG. 8 schematically represents the facilities realized by the Applicant on a laboratory scale, in order to carry out the examples of the instant patent application.
Figure 9:
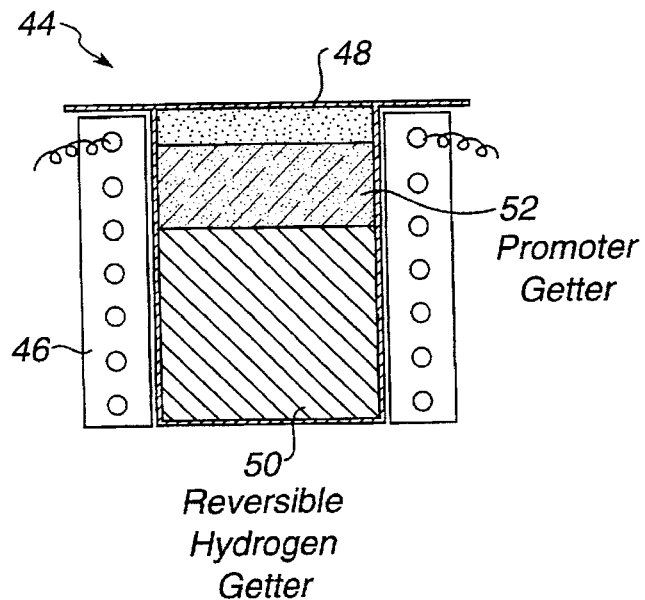
FIGS. 9 and 10 schematically show the cross-section of the housings containing respectively the reversible hydrogen getter and the promoter getter, as used in the examples.
Figure 10:
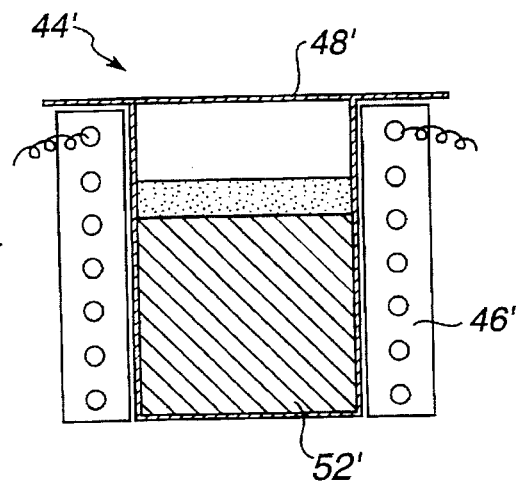

The facilities of FIG. 8 are consisting of two volumes 20,22 and V2 of respectively 0,5 and 2 liter, connected to each other by means of a valve 24. Volume 20 is in communication, by means of valve 26, with a pumping system for ultra-high vacuum, consisting of a turbomolecular pump 28 and of a rotary pump 30 provided with blades. In the volume 20 there are introduced known amounts of hydrogen and carbon monoxide, coming from two flasks 32,34 by means of metering valves 36,38. The gas pressure in the volume 20 is recorded by two capacitive manometers 40,42 having respectively a maximum recordable pressure of 133,000 Pa and 100 Pa, in order to cover a wider pressure range. The volume 22 contains two housing heating devices 44, 44', respectively illustrated in detail in FIG. 9 and FIG. 10, for the housing and the heating of the gettering metal powders. They are essentially consisting of a cylindrical coil resistance 46, 46' surrounding a cylindrical housing K, made from hardened steel, filled with getter material. The housing heating device 44 represented in FIG. 9, contains 500 mg of a reversible hydrogen getter 50 consisting of a Zr—V—Fe alloy (70% b.w. Zr; 24,6% b w. V; balance Fe) sold by the Applicant as St 707.

The equilibrium pressure $Px_1$ of such alloy, at 500° C. and for a $H_2$ concentration in the alloy equal to 0,1% b.w., is approximately 7 Pa. Said alloy is surmounted by a protective layer (300 mg) of promoter getter 52 consisting of a Zr—Mn—Fe alloy (45.4% Zr; 27.3% Mn; balance Fe) sold by the Applicant as St 909.

Such second alloy, corresponding to the intermetallic compound Zr—Mn—Fe, of the $AB_2$ type, shows a hydrogen equilibrium pressure $Px_2$, at 500° C. and for a $H_2$ concentration in the alloy equal to 0.1% b.w., higher than 100,000 Pa, as per the article of D. Shaltiel et al. (J. of the Less Common Metals, 53 (1977) 117–131; see in particular Table 3 at page 125). The second HHD, represented in FIG. 10, contains 500 mg of said promoter getter (St 909). In both the housings the getters are surmounted by a high porosity filter F retaining the powder. Granulometry:

for the St 707 alloy: from 0.1 to 125 μm;

for the St 909 alloy: from 0.1 to 125 μm.

At the outset, the two materials underwent an activation treatment and the pumping system allowed to reach a residual pressure lower than $10^{-4}$ Pa. By supplying then a suitable input voltage to the resistance of 46, 46' each of the housing heating devices 44, 44' the getter powders were heated until reaching the temperature of 600° C. The two devices 44, 44' were kept at such temperature For 1 hour keeping the vacuum pumps 28, 30 continuously running.

Once the activation was over, the device 44 was brought back to room temperature; the device 44', on the contrary, was stabilized at 350° C. by means of the temperature controller 54'. The system was then isolated from the vacuum pumps 28, 30 by closing valve 26 and successively, while closing valve 24 and suitably regulating the metering valve 36, there was introduced into volume an amount of hydrogen sufficient for reaching a pressure of 8000 Pa. By opening valve 24, the hydrogen was made to expand into volume 22, where it was adsorbed by the two devices 44, 44'. When the hydrogen was practically adsorbed in a complete way (residual pressure in the vacuum chamber lower than 0.01 Pa ) the device 44 was alternatively brought in a cyclical way, from room temperature to 500° C. and then again to room temperature and so on, by means of a temperature controller 54 and of a programmed timer (not shown). The temperature of the device 44' was kept at a constant level (350° C.). Contemporaneously was recorded the continuous change of the hydrogen pressure in the system, along with the temperature of the two devices 44, 44'. It was noted that when the device 44 was at room temperature since a long time the hydrogen pressure fell below 0.1 Pa; when the temperature was then raised to 500° C. and brought back to room level the time required by a reduction of the pressure below 1 Pa was lower than 10 minutes (return time) and the time required by a reduction of the pressure below 0.1 Pa (DRT) was lower than 15 minutes (12 minutes in the case of a $ZrV_2$ alloy as the reversible $H_2$ getter ). On occasion of the raising of the temperature to 500° C. the time was much shorter, approximately 3 minutes.

Irregularly, during the heating-cooling cycles, there were gradually introduced into the system increasing amounts of carbon monoxide until reaching an overall amount of 1.3 $Pa.m^3$.

This had no appreciable influence on the pressure values at 500° C. either on the time required for reaching such values; only when the single dosed quantities of carbon monoxide were higher than 0.6 $Pa.m^3$ it was registered a small slowing of the pressure decrease in the cooling phase but only for the first two or three cycles. Successively, after the first three cycles, the pressure course began again to be favorable.

Figure 11:
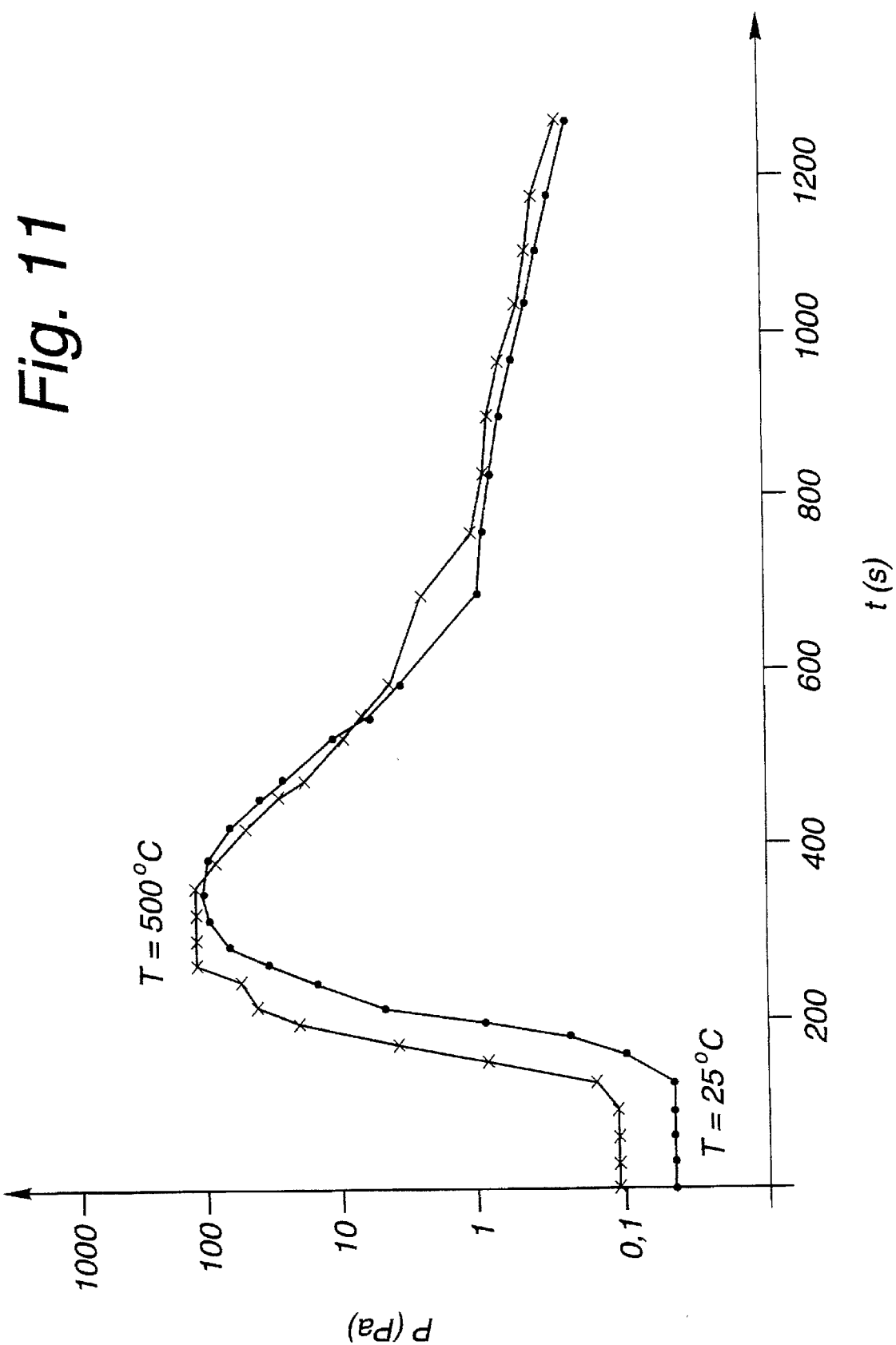
FIGS. 11 and 12 report as a plot the results of the examples.

The trend of the cycles is indicatively recorded on FIG. 11.

EXAMPLE 2 (COMPARATIVE)

Example 1 was repeated by replacing the St 909 alloy of both the protective layer (temperature=Ti) and the separate promoter getter (temperature=Tc) by equal amounts of zirconium hydride, having a $H_2$ equilibrium pressure higher than the $H_2$ equilibrium pressure $Px_1$ of the reversible hydrogen getter, namely the St 707 alloy. The results, either in the presence of hydrogen alone or after the addition of carbon monoxide were clearly worse with respect to example 1.

Figure 12:
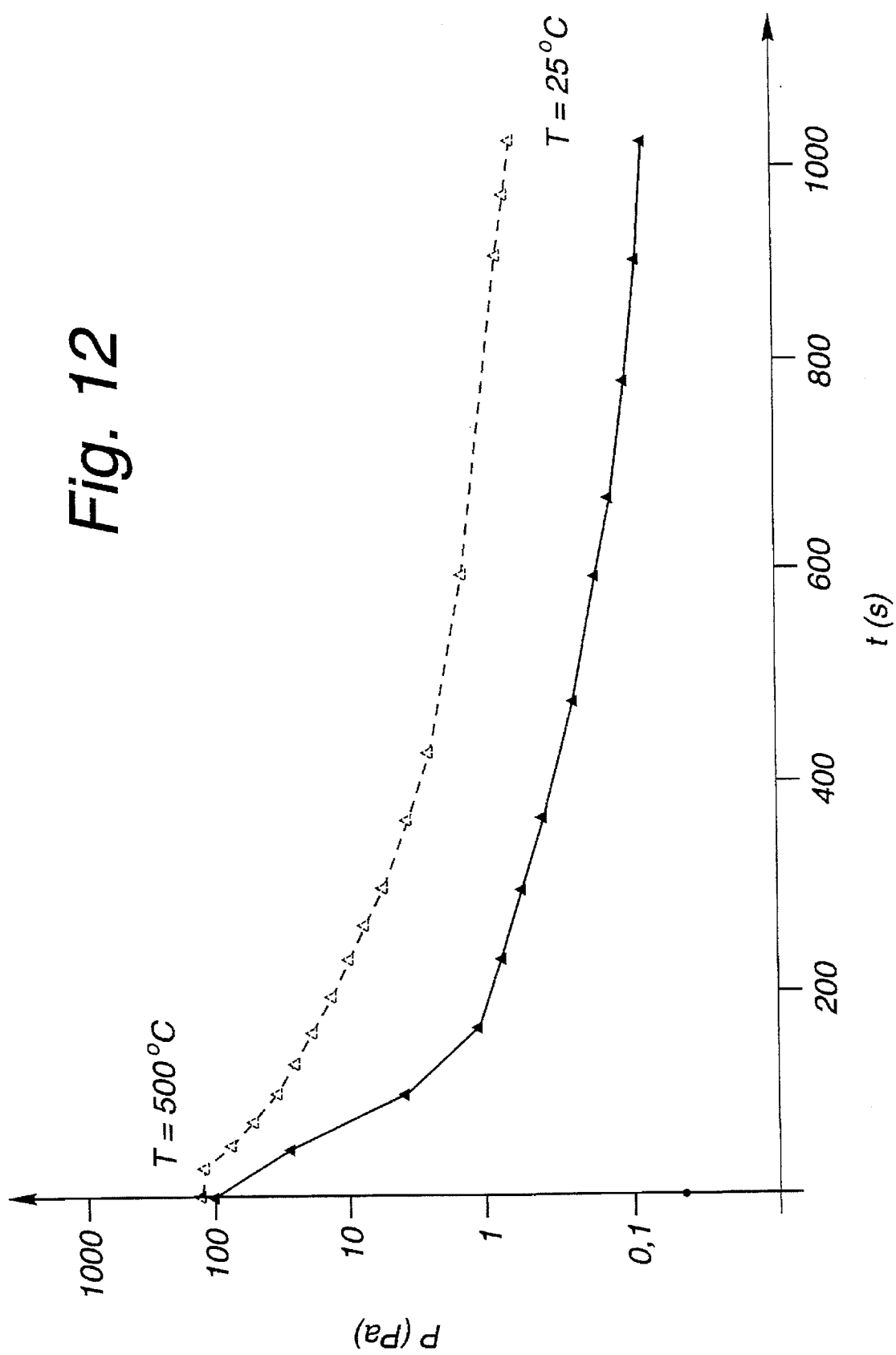
Figure 4A:
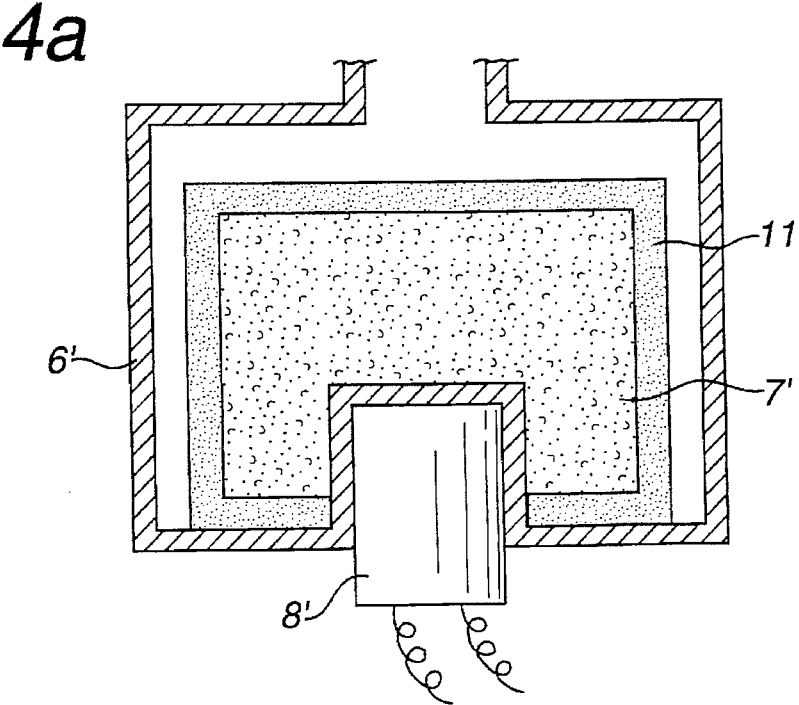

The pressure did never fall in fact below 1 Pa even after 40 minutes. The trend of the comparative cycles is indicatively recorded on FIG. 12 (concerning only the cooling phase from 500° C. to 25° C.).

We claim:

1. A thermally insulating jacket under reversible vacuum, having an inner wall, an outer wall and an hollow space between said walls in fluid communication with an outer housing containing a reversible non-evaporable hydrogen getter loaded with hydrogen before use, wherein:
   a) said reversible hydrogen getter has hydrogen equilibrium pressure $px_1$ lower than 100 mbar at 500° C., when the hydrogen concentration in the getter is 0.1% by weight, and is kept at a variable or constant temperature Ti different from the temperature Tc of the hotter wall of the jacket;
   b) said hollow space contains a non-evaporable promoter getter having a hydrogen equilibrium pressure $Px_2$ higher than 100 mbar at 500° C., when the hydrogen concentration in the getter is 0.1% by weight, which is exposed to a temperature Tc different from Ti.

2. An insulating jacket according to claim 1, wherein the amount of hydrogen in said reversible hydrogen getter before use is corresponding to a working pressure inside the jacket, ranging from 5 Pa, when the temperature is at room level, to 50 Pa, when the temperature is at 500° C.

3. An insulating jacket according to claim 1, wherein said promoter getter is in contact with said hotter wall.

4. A jacket according to claim 1, wherein said pressure $Px_1$ is lower than 1000 Pa and wherein said pressure $Px_2$ is higher than ten times $Px_1$.

5. A jacket according to claim 4, wherein— said pressure $Px_1$ is lower than 1000 Pa and wherein said pressure $Px_2$ is higher than one hundred times $Px_1$.

6. A jacket according to claim 1, wherein said reversible hydrogen getter is coated with a protective layer of said promoter getter, which is kept at the same temperature Ti of said reversible hydrogen getter.

7. A jacket according to claim 6, wherein said protective layer is surmounted by a porous septum.

8. A jacket according to claim 7, wherein the ration between the mass of said protective layer and the sum of the mass of said reversible hydrogen getter and of the mass of the promoter getter exposed to said temperature Tc is from 0.001:1 to 1:1.

9. A jacket according to claim 8, wherein the ration between the mass of said protective layer and the sum of the mass of said reversible hydrogen getter and of the mass of the promoter getter exposed to said temperature Tc is from 0.01:1 to 0.5:1.

10. A jacket according to claim 8, wherein at least 85% by volume of the particles has an average size lower than 100 micrometers and wherein the volume percentage of the particles having an average size lower than 15 micrometers is equal to or lower than 10%.

11. A jacket according to claim 1, having a characteristic working pressure ranging from 0.1 Pa, when the temperature is at room level, to 100 Pa, when the temperature is 500° C.

12. A jacket according to claim 1, having a characteristic return time, namely the time required by the passage from a pressure of 100 Pa, when said temperature ti is 500° C., too a pressure of 1 Pa, when said temperature Ti is at room level, lower than 10 minutes either in the absence or in the presence of carbon monoxide.

13. A jacket according to claim 1, having a characteristic deep return time, namely the time required by the passage from a pressure of 100 Pa, when said temperature Ti is 500° C., to a pressure of 0.1 Pa, when said temperature Ti is at room level, lower than 15 minutes, either in the absence or in the presence of carbon monoxide.

14. A jacket according to claim 10, having a characteristic deep return time, namely the time required by the passage from a pressure of 100 Pa, when said temperature Ti is 500° C., to a pressure of 0.1 Pa, when said temperature Ti is at room level, lower than 12 minutes, either in the absence or in the presence of carbon monoxide.

15. A jacket according to claim 1, wherein said promoter getter is selected from the alloys $ZrM_2$, wherein M is a transition element selected from Cr, Mn, Fe, Co, Ni and mixtures thereof.

16. A jacket according to claim 12, wherein said reversible hydrogen getter is a non-evaporable ternary getter alloy having a percent composition by weight which when recorded on a diagram suitable from ternary compositions, is lying inside a polygon having at its vertices the points defined as follows:
   A) 78% Zr—20% V—2% Fe
   B) 45% Zr—20% V—35% Fe
   C) 48% Zr—50% V—2% Fe.

17. A jacket according to claim 1, wherein said promoter getter is selected from:
   i) the zirconium-manganese-iron alloys (Zr, Mn, Fe);
   ii) the titanium-vanadium alloys having a high manganese content;
   iii) the titanium-vanadium alloys having a low manganese content;
   iv) the titanium-nickel alloys and/or the lanthanum-nickel alloys of the $AB_5$ type;
   v) mixtures thereof.

18. A jacket according to claim 1, wherein said reversible hydrogen getter is selected from:
   i) the alloys containing zirconium and vanadium and in particular the zirconium-vanadium-iron alloys;
   ii) the zirconium-aluminum alloys;
   iii) zirconium;
   iv) titanium;
   v) mixtures thereof.

19. A jacket according to claim 1, supplied with a heating device which is outside said housing containing said reversible hydrogen getter.

20. A jacket according to claim 1, supplied with a heating device which is directly immersed in said reversible hydrogen getter.

21. A jacket according to claim 17, wherein said heating device is supplied with heat dispersing blades.

22. A jacket according to claim 1, wherein said heating device is supplied with heat dispersing fins.

23. A jacket according to claim 1, wherein said hollow space contains solid insulating material, in particular polystyrene, phenolformaldehyde resins, polyacetalic resins and combinations thereof.

24. A jacket according to claim 1, wherein said reversible hydrogen getter is in the form of shaped bodies like pellets, granules, tablets, rings, saddles, and coated strips.

25. A jacket according to claim 1, wherein said reversible hydrogen getter is in the form of a powder.

26. A jacket according to claim 1, having a shape selected form:
- a cylindrical shape;
- a hemicylindrical shape;
- a shape of two hemicylinders, wherein the first is under reversible vacuum and the second is under stable vacuum.

27. A jacket according to claim 1, wherein said promoter getter is in the form of shaped bodies like pellets, granules, tablets, rings, saddles, and coated strips.

28. A jacket according to claim 1, wherein said promoter getter is in the form of a powder.

29. A jacket according to claim 1, having a shape of two hemicylinders, wherein the first is under reversible vacuum and the second is under reversible vacuum.

* * * * *

UNITED STATES PATENT AND TRADEMARK OFFICE
CERTIFICATE OF CORRECTION

PATENT NO : 5,625,742
DATED : July 6, 1994
INVENTOR(S) : Boffito, et al.

It is certified that error appears in the above-indentified patent and that said Letters Patent is hereby corrected as shown below Column 2, line 34, change "ZF" to --Zr--.
Column 4, line 4, change "temperatute" to --temperature--.
Column 7, line 5, change "off" to --of--.
Column 7, line 56, change "K" to --48, 48'--.
Column 8, line 29, after "volume", insert --20--.
Column 8, line 39, after "shown", insert --)--.

Signed and Sealed this

Third Day of February, 1998

*Attest:*

BRUCE LEHMAN

*Attesting Officer*  *Commissioner of Patents and Trademarks*